(12) United States Patent
Jain et al.

(10) Patent No.: US 12,197,975 B2
(45) Date of Patent: Jan. 14, 2025

(54) ASYNCHRONOUS COMMUNICATION IN CLUSTER INFRASTRUCTURES

(71) Applicant: Red Hat, Inc., Raleigh, NC (US)

(72) Inventors: Vaibhav Jain, Meerut (IN); Jacopo Rota, Saronno (IT)

(73) Assignee: Red Hat, Inc., Raleigh, NC (US)

( * ) Notice: Subject to any disclaimer, the term of this patent is extended or adjusted under 35 U.S.C. 154(b) by 50 days.

(21) Appl. No.: 17/945,278

(22) Filed: Sep. 15, 2022

(65) Prior Publication Data

US 2024/0095104 A1 Mar. 21, 2024

(51) Int. Cl.
G06F 9/54 (2006.01)
G06F 9/38 (2018.01)
H04L 67/60 (2022.01)

(52) U.S. Cl.
CPC ............ *G06F 9/546* (2013.01); *G06F 9/3871* (2013.01); *H04L 67/60* (2022.05)

(58) Field of Classification Search
CPC ......... G06F 9/546; G06F 9/3871; H04L 67/60
See application file for complete search history.

(56) References Cited

U.S. PATENT DOCUMENTS

| | | | |
|---|---|---|---|
| 9,462,427 B2 | 10/2016 | Patel et al. | |
| 10,419,366 B1 * | 9/2019 | Kim | H04L 69/22 |
| 10,979,359 B1 * | 4/2021 | Mishra | H04L 47/805 |
| 2013/0208621 A1 * | 8/2013 | Manghirmalani | H04L 45/44 |
| | | | 370/254 |
| 2017/0085462 A1 * | 3/2017 | Zhou | H04L 41/12 |
| 2018/0083864 A1 * | 3/2018 | Chen | G06F 9/546 |
| 2018/0375961 A1 * | 12/2018 | Wang | H04M 15/64 |
| 2020/0348984 A1 | 11/2020 | Giannetti et al. | |
| 2021/0409282 A1 | 12/2021 | Patki et al. | |
| 2022/0197688 A1 * | 6/2022 | Oki | G06F 9/45558 |
| 2022/0206832 A1 * | 6/2022 | Berry | G06F 9/45558 |
| 2022/0286993 A1 * | 9/2022 | Youn | H04W 68/005 |
| 2023/0043336 A1 * | 2/2023 | Mitkar | G06F 3/0631 |
| 2023/0091112 A1 * | 3/2023 | Kumar | G06F 9/44505 |
| | | | 713/1 |

(Continued)

FOREIGN PATENT DOCUMENTS

| | | |
|---|---|---|
| CN | 109067828 B | 1/2022 |
| CN | 114422371 A | 4/2022 |

OTHER PUBLICATIONS

Johansson, Bjarne et al., "Kubernetes Orchestration of High Availability Distributed Control Systems", [date], pp. 8. website: http://www.es.mdh.se/pdf_publications/6384.pdf.

(Continued)

*Primary Examiner* — Michael A Keller
*Assistant Examiner* — Thao D Duong
(74) *Attorney, Agent, or Firm* — Womble Bond Dickinson (US) LLP

(57) ABSTRACT

A first controller application of a control plane of a cluster infrastructure may detect a message from a message queue of a data plane of the cluster infrastructure. The message may include a request to instantiate a new service. Responsive to detecting the message, a request may be transmitted to a second controller application of the control plane. Responsive to the request, the second controller application may instantiate the new service within the data plane.

20 Claims, 5 Drawing Sheets

(56) References Cited

U.S. PATENT DOCUMENTS

| | | | |
|---|---|---|---|
| 2023/0107891 A1* | 4/2023 | Miriyala | H04L 41/122 |
| | | | 370/254 |
| 2023/0224785 A1* | 7/2023 | Kang | H04W 4/16 |
| | | | 455/442 |
| 2023/0336414 A1* | 10/2023 | Miriyala | H04L 45/42 |
| 2024/0211013 A1* | 6/2024 | Parab | G06F 11/1464 |

OTHER PUBLICATIONS

KubeMQ, "Kubernetes Message Queue", 2019, pp. 3. website: https://kubemq.io/kubernetes-message-queue/.

Unknown Author, "Asynchronous Message-Based Communication", Apr. 13, 2022, pp. 7; website: https://docs.microsoft.com/en-us/dotnet/architecture/microservices/architect-microservice-container-applications/asynchronous-message-based-communication.

* cited by examiner

ASYNCHRONOUS COMMUNICATION IN CLUSTER INFRASTRUCTURES

TECHNICAL FIELD

Aspects of the present disclosure relate to computer cluster infrastructures, and more particularly, to the asynchronous communication between a control plane and a data plane of a cluster infrastructure.

BACKGROUND

Containers are components executing on an operating system that provide an environment for applications to run, while being isolated from any other components of a host machine, network, or data center etc. Multiple containers may execute on a single operating system kernel and share the resources of the hardware upon which the operating system is running.

A clustering infrastructure may schedule one or more containers for execution on one or more computing nodes (e.g., a computer server, virtual machine, or processing device). For example, load balancers or other types of scheduling operations may be used to distribute the one or more containers among the one or more computing nodes to execute services provided by the containers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
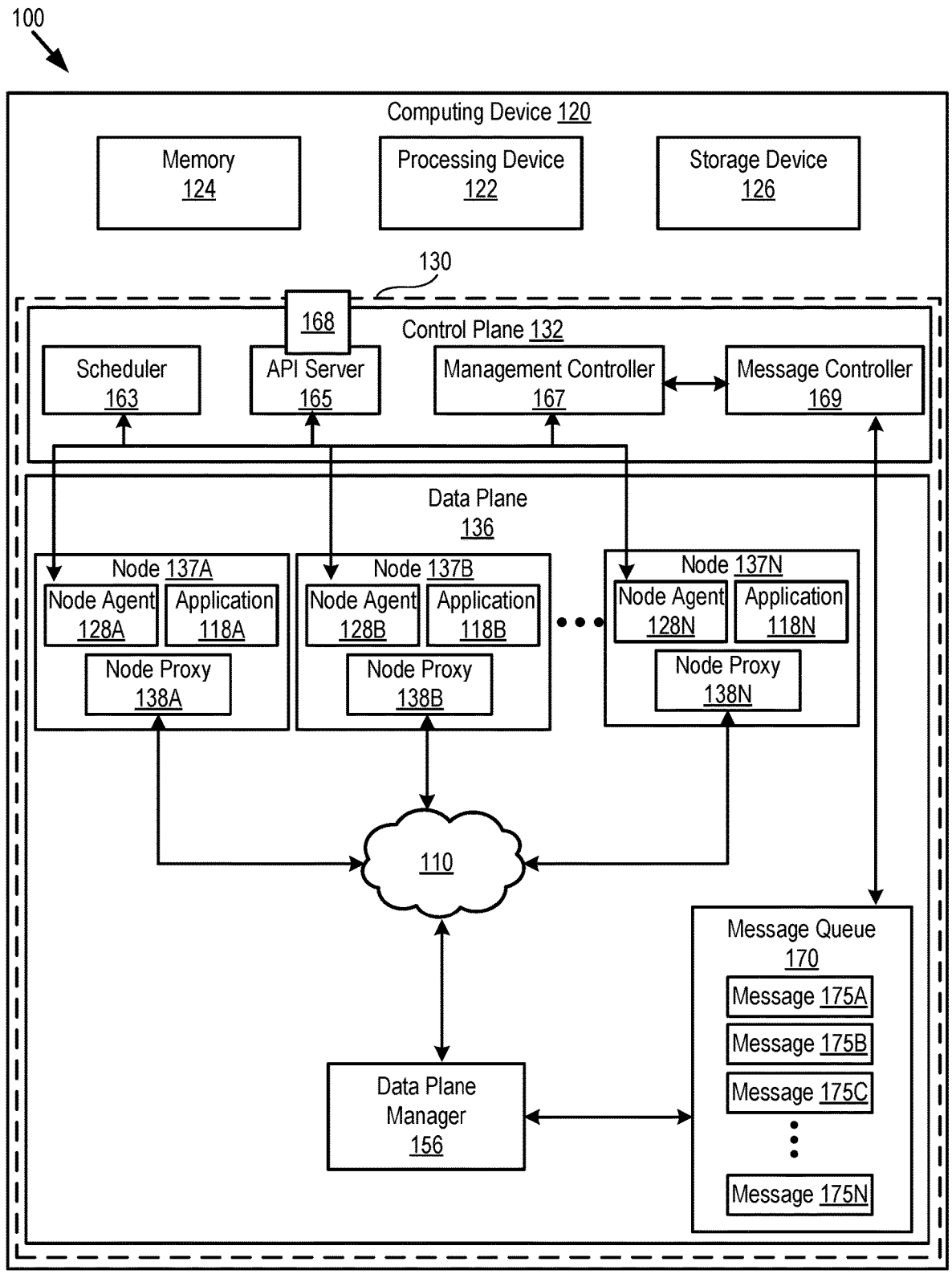
FIG. 1 is a schematic block diagram that illustrates an example system, in accordance with some embodiments of the present disclosure.

In computer systems supporting development and execution of application services, virtual machines and/or containers may be used. As an example, a virtual machine ("VM") may be a robust simulation of an actual physical computer system utilizing a hypervisor to allocate physical resources to the virtual machine. As another example, containers are active components executing on an operating system of a host system that provide an environment for applications to run, while being isolated from any other components of the host system. Multiple containers may execute on a single operating system kernel and share the resources of the hardware the operating system is running on.

Container-based virtualization systems may be lighter weight than systems using virtual machines with hypervisors. Containers may allow widespread, parallel deployment of computing power for specific tasks. For example, a container may be instantiated to process a specific task and terminated after the task is complete. In large scale implementations, container orchestrators (e.g., Kubernetes™) may be used that manage the deployment and scheduling of large numbers of containers across multiple compute nodes. One example of a container orchestration platform is the Red Hat™ OpenShift™ platform built around Kubernetes.

Container orchestrators may employ cluster infrastructures. Cluster infrastructures may include a number of applications providing services (e.g., containers and/or VMs, also referred to as the data plane) and a control plane that manages the execution and/or distribution of the applications on one or more compute nodes. In a cluster infrastructure for containers, the compute nodes, which may include physical hosts, processors on a physical host, or virtual machines, may be configured as resources for execution of the containers. The container orchestrators, which may include a management controller within the control plane, may move the containers between and among the compute nodes as part of managing the execution of the containers within the data plane. The control plane of the cluster infrastructure may perform the scheduling and/or load balancing of the containers and their associated applications among the compute nodes. In addition, the control plane, such as the management controller of the control plane, may be responsible for provisioning new services in the data plane or modifying characteristics of the services.

While the services executing on the compute nodes of the data plane may be capable of communicating with one another, in some cases the services of the compute nodes may not be capable of communicating with the control plane. For example, a service of a compute node may not have the information such as an address (e.g., an internet protocol (TP) address) or a certificate for communicating with a management controller and/or scheduler of the control plane. As a result, the services may not be able to contact the management controller to provision a new service and/or modify an existing service when such an action is warranted.

The present disclosure addresses the above-noted and other deficiencies by providing a message queue within the data plane of a cluster infrastructure. The message queue may be capable of receiving messages including requests from services and/or other applications executing within the data plane. The requests may include, for example, requests to instantiate new services and/or requests to modify the characteristics of existing services. A message controller within the control plane may monitor the message queue to detect the messages from the message queue within the data plane. Responsive to detecting the messages, the message controller may send a communication to the management controller of the control plane that includes the request from the message. This may allow for an asynchronous path for instantiating new services and/or modifying existing services from within the data plane. Embodiments of the present disclosure may provide an improved cluster infrastructure having capabilities for modification and service control that are not provided by conventional cluster infrastructures.

FIG. 1 is a schematic block diagram that illustrates an example system 100, in accordance with some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing device 120.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Though illustrated as a separate element, in some embodiments, the storage device 126 may be part of memory 124.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

As illustrated in FIG. 1, computing device 120 may run a cluster infrastructure 130. For example, the cluster infrastructure 130 may be stored as computer instructions in memory 124, and may be executed by processing device 122. The cluster infrastructure 130 may include a control plane 132 and a data plane 136.

The data plane 136 may include a plurality of compute nodes 137. As an example only, FIG. 1 illustrates compute nodes 137A, 137B, through 137N. The compute nodes 137 may be threads, processes, or processing devices, in some embodiments. The compute nodes 137 may be assigned one or more applications 118. The application 118 may be a desktop application, a network application, a database application, or any other application that may execute within the data plane 136 of the cluster infrastructure 130. The applications 118 may provide one or more services of the cluster infrastructure 130. As an example only, FIG. 1 illustrates applications 118A, 118B, through 118N. As a non-limiting example, in a Kubernetes configuration, the node 137 may correspond to a compute node, and the application 118 may correspond to a container executing a service. Applications 118A to 118N may be different instantiations of the same application 118 (e.g., providing a same service), but the embodiments of the present disclosure are not limited to such a configuration. In some embodiments, one or more of the applications 118A to 118N may be different (e.g., comprise a different executable and/or provide a different service) than other ones of the applications 118A to 118N.

The control plane 132 of the cluster infrastructure 130 may control the execution and/or scheduling of the data plane 136. In some embodiments, requests for a service may initially be provided to the control plane 132 for scheduling on the data plane 136. The control plane 132 may expose one or more access points, such as an application programming interface (API) and/or access point 168 of the application 118.

The control plane 132 may include a scheduler 163, an API server 165, and a management controller 167. The management controller 167 may control the instantiation and/or settings of the applications 118 and the compute nodes 137. For example, the management controller 167 may be configured to stop and/or start applications 118 on compute nodes 137. In some embodiments, applications 118 may be loaded based on a deployment record. The deployment record may specify an image which is to be used for the application 118, where the image is a data file including, for example, executable instructions and supporting libraries for executing the application 118. To start a new application 118, the management controller 167 may allocate a compute node 137 and configure the loading of the image associated with the new application 118 to the compute node 137. In some embodiments, starting a new application 118 may include allocating the application 118 to an already existing compute node 137. To stop a currently running application 118, the management controller 167 may halt execution of the compute node 137 upon which the application 118 is executing or send instructions to the compute node 137 to halt execution of the application 118.

In addition to starting and/or stopping an application 118, the management controller 167 may also be able to modify characteristics of a compute node 137 or an application 118 executing on the compute node 137. For example, the management controller 167 may be capable of modifying security parameters, resource usage, or network configuration of the application 118 and/or compute node 137, to name just a few.

The scheduler 163 may schedule the applications 118 on the various compute nodes 137. For example, in some embodiments, the scheduler 163 may perform a load balancing function for incoming requests to the cluster infrastructure 130. In response to receiving an incoming request, the scheduler 163 may determine which of the nodes 137 is available for execution of the request, and forward the request to the determined node 137.

The API server 165 may expose API functionality for the applications 118. For example, the API server may listen for requests on an access point 168 (e.g., on a particular network port) and, after processing the requests, such as for security or validation, provide the request to the scheduler 163 for operation by the applications 118 of the various compute nodes 137. In some embodiments, the incoming requests or other communication may be directed directly to the applications 118 of the nodes 137, bypassing the API server 165.

In some embodiments, a node agent 128 may execute on the nodes 137. As an example only, FIG. 1 illustrates node agents 128A, 128B, through 128N. The node agent 128 may execute as part of the compute node 137 and may be configured to communicate with the scheduler 163, the API server 165, and/or the management controller 167. For example, the node agent 128 may receive requests from the management controller 167 to modify settings of the application 118. In some embodiments, the application 118 may be isolated from the node agent 128. For example, the node agent 128 may act as an extension of the control plane 132 to allow communication between the compute node 137 and the control plane 132, but not necessarily communication from the application 118 and the control plane 132.

In some embodiments, the compute nodes 137 and/or applications 118 may communicate over a network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI™ hotspot connected with the network 110 and/or a wireless carrier system that can be implemented using various data processing equipment, communication towers (e.g., cell towers), etc. The network 110 may carry communications (e.g., data, message, packets, frames, etc.) to and/or from the compute nodes 137 and/or applications 118. As an example only, FIG. 1 illustrates node proxies 138A, 138B, through 138N. The node proxy 138 may manage network routing for the compute node 137 on the network 110. For example, when the control plane 132 is instantiated across more than one computing device 120, the node proxies 138 may maintain a virtual private network (VPN) or other networking infrastructure between the computing devices 120 on network 110. In some embodiments, the applications 118 may be communicatively coupled to the network 110 utilizing the node proxy 138. Thus, the node proxy 138 may allow the different applications 118 of the nodes 137 to communicate among one another.

While the applications 118 may be able to communicate directly with one another, they may not, in some embodiments, have a direct connection to all of the elements of the control plane 132. For example, the applications 118 may not have the credentials and/or location (e.g., an IP address) of the management controller 167 so as to communicate directly with the management controller 167. As a result, the applications 118 may not be able to directly request that certain tasks be performed by the management controller 167.

To facilitate communication between the control plane 132 and the data plane 136, some embodiments of the present disclosure provide a message queue 170, a data plane manager 156, and a message controller 169. In some embodiments, the message queue 170 and the data plane manager 156 may be resident within the data plane 136, but the embodiments of the present disclosure are not limited thereto. In some embodiments, the message queue 170 may be provided as a data structure accessible on a system (e.g., on a computing device 120) that is accessible by network 110.

In some embodiments, the data plane manager 156 may be provided as a stand-alone service, or may be instantiated as an application 118 executing on a compute node 137. The data plane manager 156 may be communicatively coupled to network 110. Thus, the data plane manager 156 may be configured to receive requests from one or more of the applications 118 executing on the compute nodes 137. In addition, the data plane manager 156 may be configured to receive requests from external to the cluster infrastructure 130 (e.g., from a user that sends a request to the cluster infrastructure 130).

The message queue 170 may be configured to receive and store messages 175. As an example only, FIG. 1 illustrates messages 175A, 175B, through 175N. In some embodiments, the message queue 170 may be a First-In, First-Out (FIFO) buffer, but the embodiments of the present disclosure are not limited to such a configuration. In some embodiments, the message queue 170 may be, or may be formed from, a database. The message queue 170 may receive messages from the data plane manager 156 and store them for retrieval by the message controller 169. In some embodiments, the message queue 170 may receive messages from the message controller 169 and store them for retrieval by the data plane manager 156.

The message controller 169 may be resident in the control plane 132. The message controller 169 may be communicatively coupled to the management controller 167. Though the message controller 169 is illustrated as being coupled solely to the management controller 167 in FIG. 1, embodiments of the present disclosure are not limited to such a configuration. In some embodiments, the message controller 169 may be communicatively coupled to other elements of the control plane 132, such as the API server 165 and the scheduler 163.

The message controller 169 and the data plane manager 156 may both be configured to communicate with the message queue 170. For example, the message queue 170 may be coupled to the network 110 and/or the data plane manager 156 and the message controller 169 (or the computing devices 120 upon which they are executing) may be configured to have networked or local access to the message queue 170. For example, an address (e.g., IP address) and/or route may be coupled between the message controller 169 and the message queue 170, but this is only an example. It will be understood that other formats and/or routes of communication may be provided between the message controller 169, the data plane manager 156, and the message queue 170 without deviating from the embodiments of the present disclosure.

The data plane manager 156 may be configured to receive requests from applications 118 of the data plane 136 over network 110. These requests may include requests for action from the management controller 167 of the control plane 132. For example, if an application 118B on compute node 137B would like to instantiate a new service (e.g., a new application 118 and/or a new compute node 137), the application 118B may send a request to the data plane manager 156.

The data plane manager 156 may convert the request to a message 175. The data plane manager 156 may send the message 175 to the message queue 170. The message queue 170 may store the message 175.

Message controller 169 may detect that a new message 175 is available in the message queue 170. In some embodiments, the message controller 169 may poll the message queue 170 at periodic intervals to detect the presence of the new message 175, though the embodiments of the present disclosure are not limited thereto. In some embodiments, the message queue 170 may send a notification to the message controller 169 when a new message 175 is available. The message controller 169 may retrieve the message 175 from the message queue 170. In some embodiments, the message controller 169 may unpack the message to determine the original request that was sent from the application 118B.

The message controller 169 may forward the request extracted from the message 175 to the management controller 167. The management controller 167 may examine the request to determine if the request is valid and, if so, perform the requested function on behalf of the application 118B.

Embodiments of the present disclosure may allow for applications 118 and/or their associated services to request services of the control plane 132. Embodiments of the present disclosure provide a communication path that increases the flexibility of the communication options for the applications 118 of the cluster infrastructure 130. Moreover, the communication path of the embodiments of the present disclosure is asynchronous. The message 175 may be forwarded to the control plane 132 without requiring the application 118 to spend excessive computing resources waiting for the response. The asynchronous nature of the message queue 170 may allow for increased functionality, and thus an improvement to the operation of the cluster infrastructure 130, while not significantly increasing the amount of computing resource to provide the solution.

Figure 2:
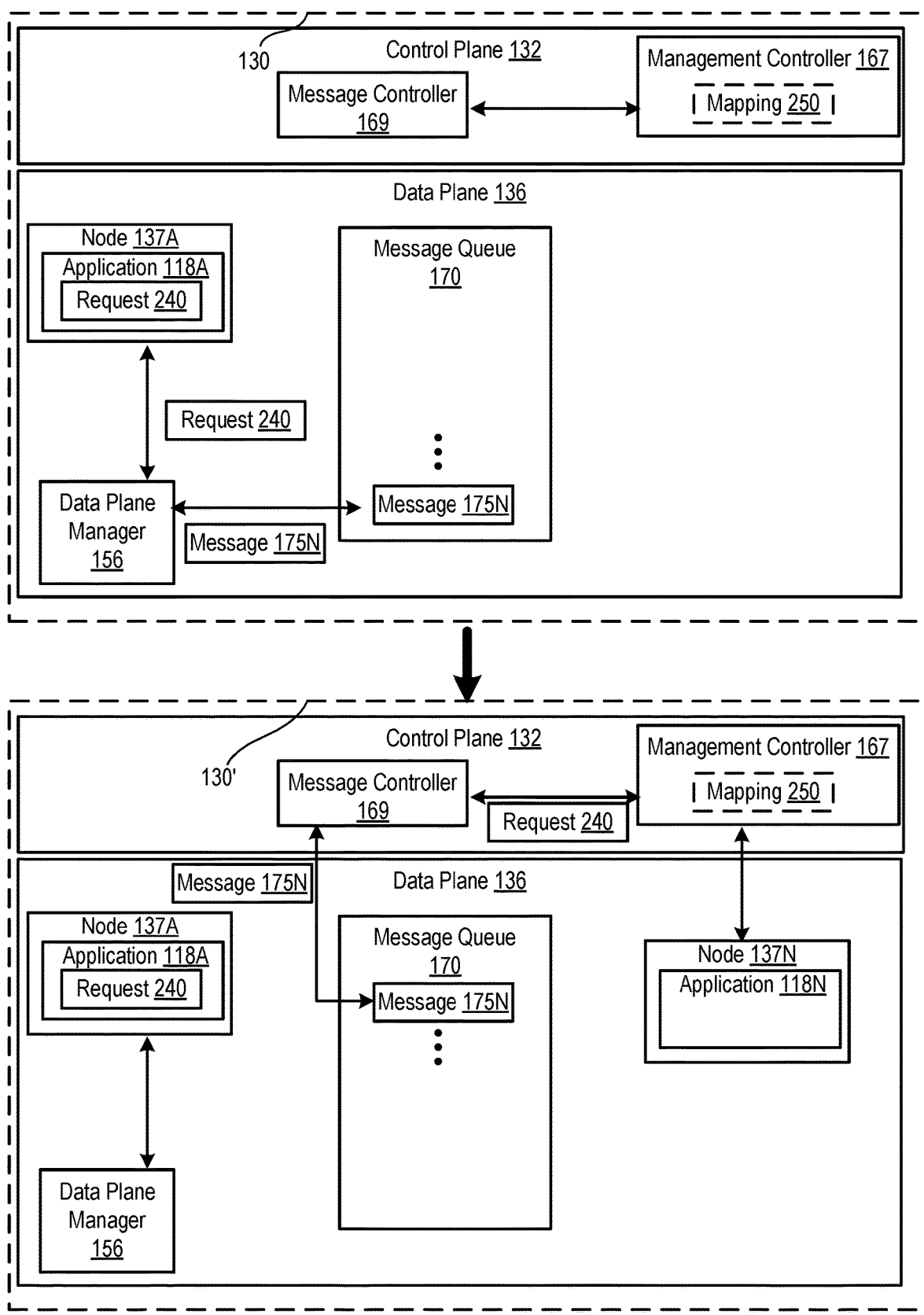
FIG. 2 is a schematic block diagram illustrating an example of utilizing a message queue to instantiate a new application, in accordance with some embodiments of the present disclosure.

As described herein, message queue 170 may be used to communicate requests for the cluster infrastructure 130 between the control plane 132 and the data plane 136. The requests may include, for example, requests to add a new service and/or application 118 to the cluster infrastructure 130. FIG. 2 is a schematic block diagram illustrating an example of utilizing the message queue 170 to instantiate a new application 118, in accordance with some embodiments of the present disclosure. A description of elements of FIG. 2 that have been previously described has been omitted for brevity. For example, some of the elements of the cluster infrastructure illustrated in FIG. 1 have been removed to aid in explanation of the figure. FIG. 2 illustrates a scenario in which a first application 118A executing on a first compute node 137A within the data plane 136 requests a start of a new service within a first cluster infrastructure 130 to transition to a second cluster infrastructure 130'.

Referring to FIG. 2, an application 118A on compute node 137A within the data plane 136 may create a request 240 associated with the instantiation/starting of a new application 118N and/or service within the data plane 136. The application 118A may also be providing a service of the data plane 136. In some embodiments, the application 118A executing within the data plane 136 may not have the credentials and/or the network access to make a request directly of the management controller 167 in the control plane 132. The request 240 may contain details regarding a service that application 118A wishes to start. For example, the request 240 may contain a unique name associated with the service and/or application 118N that is to be started. As another example, the request 240 may contain an indication of a location of an image associated with the requested service. For example, the request 240 may contain a uniform resource locator (URL) that indicates a location of the image from which the requested service may be instantiated.

The application 118A may send the request 240 to the data plane manager 156. In some embodiments, the request 240 may be sent over network 110 (see FIG. 1) but the embodiments of the present disclosure are not limited to such a configuration. In some embodiments, the application 118A may maintain a link to the data plane manager 156 that is separate from the network 110 of FIG. 1.

The data plane manager 156 may convert the request 240 to a message 175N. For example, the data plane manager 156 may encapsulate the request 240 within a message structure understood by the message controller 169 as part of the message 175N. The data plane manager 156 may send the message 175N to the message queue 170. The message queue 170 may store the message 175N. For example, the message queue 170 may store the message 175N as part of the memory (e.g., memory 124) of the computing device 120 upon which the message queue 170 is located.

Referring to the cluster infrastructure 130' of FIG. 2, the message controller 169 within the control plane 132 may subsequently detect that the message 175N is available in the message queue 170. In some embodiments, the message controller 169 may poll the message queue 170 at periodic intervals to detect the presence of the new message 175N, though the embodiments of the present disclosure are not limited thereto. In some embodiments, the message queue 170 may send a notification to the message controller 169 when the new message 175N is available. The message controller 169 may retrieve the message 175N from the message queue 170. In some embodiments, the message controller 169 may unpack the message to determine the original request 240 that was sent from the application 118A.

The message controller 169 may forward the request 240 extracted from the message 175 to the management controller 167 within the control plane 132. The management controller 167 may examine the request 240 to determine if the request 240 is valid. For example, the management controller 167 may examine a source of the request 240 (e.g., the application 118A) and/or credential associated with the request 240.

In some embodiments, the management controller 167 may examine information in the request that indicates the application 118N to be started. For example, the request 240 may include a unique name of the application 118N to be started. In some embodiments, the management controller 167 may maintain a mapping 250 between unique names and locations at which the executable instructions for an application 118 may be located. For example, the mapping 250 may map a unique name of a service and/or application 118 with a URL to a location for an image of a container associated with the service and/or application 118. In some embodiments, the request 240 itself may contain the location such that the mapping 250 is not necessary. In such cases, the management controller 167 may utilize the URL and/or location of the image to access the image for the service and/or application 118N.

If the request 240 is authenticated by the management controller 167 (e.g., the application 118A has the appropriate permissions) and the management controller 167 is able to access the application image from the location specified by the mapping 250 and/or the request 240, the management controller 167 may perform the request 240. For example, the management controller 167 may facilitate the creation of a new compute node 137N and may provision the new compute node 137N with the new application 118N specified by the request 240. Thus, a modified cluster infrastructure 130' may be formed having the new application 118N.

Though FIG. 2 illustrates an example in which a new compute node 137N is formed for the new application 118N, the embodiments of the present disclosure are not limited to such a configuration. In some embodiments, the new application 118N may be located on an existing compute node 137, such as compute node 137A in FIG. 2.

Though FIG. 2 illustrates an embodiment in which the request 240 is transmitted from an application 118 of a compute node 137, the embodiments of the present disclosure are not limited thereto. In some embodiments, the request 240 may be received by the data plane manager 156 from external to the cluster infrastructure 130. For example, a user may send a request directly to the data plane manager 156 via an API of the data plane manager 156 or other communication path.

Figure 3:
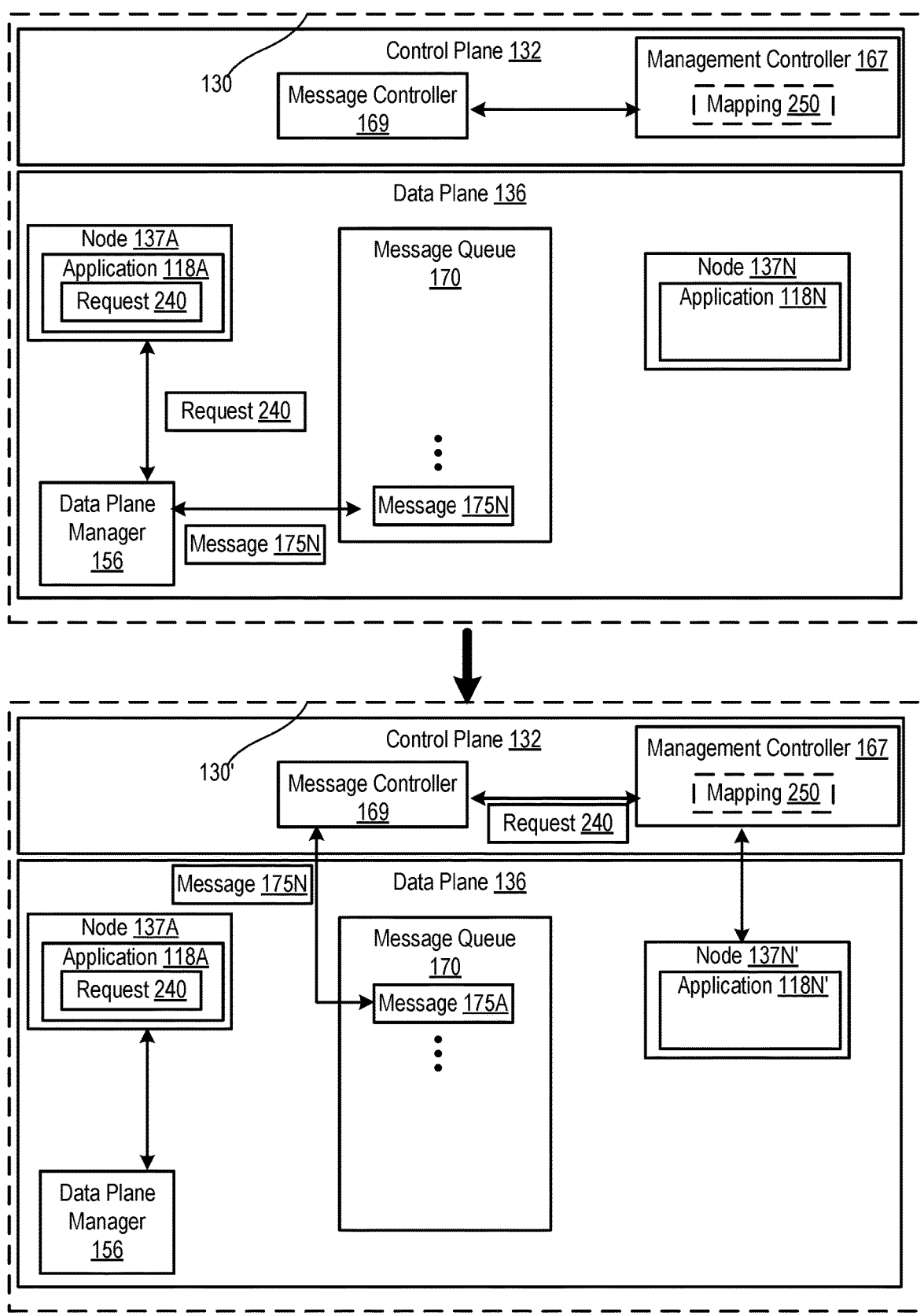
FIG. 3 is a schematic block diagram illustrating an example of utilizing a message queue to modify an existing application, in accordance with some embodiments of the present disclosure.

FIG. 3 is a schematic block diagram illustrating an example of utilizing the message queue 170 to modify an existing application 118N, in accordance with some embodiments of the present disclosure. FIG. 3 illustrates a scenario in which a first application 118A executing on a first compute node 137A within the data plane 136 wishes to modify a second existing application 118N executing on a compute node 137N within the data plane 136 of the cluster infrastructure 130.

Referring to FIG. 3, the first application 118A on a first compute node 137A within the data plane 136 creates a request 240 associated with the modification of a characteristic and/or state of the second application 118N on a second compute node 137N. In some embodiments, the first application 118A executing within the data plane 136 may not have the credentials and/or the network access to make such a request directly of the management controller 167 in the control plane 132. The request 240 may contain details identifying the second application 118N and/or the second compute node 137N. For example, the request 240 may contain a unique name associated with the second application 118N and/or the second compute node 137N. As another example, the request 240 may contain an address (e.g., an IP address) associated with the second application 118N and/or the second compute node 137N.

The first application 118A may send the request 240 to the data plane manager 156. In some embodiments, the request 240 may be sent over network 110 (see FIG. 1) but the embodiments of the present disclosure are not limited to such a configuration. In some embodiments, the first application 118A may maintain a link to the data plane manager 156 that is separate from the network 110 of FIG. 1.

The data plane manager 156 may convert the request 240 to a message 175N. For example, the data plane manager 156 may encapsulate the request 240 within a message structure understood by the message controller 169 as part of the message 175N. The data plane manager 156 may send the message 175N to the message queue 170. The message queue 170 may store the message 175N. For example, the message queue 170 may store the message 175N as part of the memory (e.g., memory 124) of the computing device 120 upon which the message queue 170 is located.

Referring to the cluster infrastructure 130' of FIG. 3, the message controller 169 within the control plane 132 may subsequently detect that the message 175N is available in the message queue 170. In some embodiments, the message controller 169 may poll the message queue 170 at periodic intervals to detect the presence of the new message 175N, though the embodiments of the present disclosure are not limited thereto. In some embodiments, the message queue 170 may send a notification to the message controller 169 when the new message 175N is available. The message controller 169 may retrieve the message 175N from the message queue 170. In some embodiments, the message controller 169 may unpack the message to determine the original request 240 that was sent from the first application 118A.

The message controller 169 may forward the request 240 extracted from the message 175 to the management controller 167 within the control plane 132. The management controller 167 may examine the request 240 to determine if the request 240 is valid. For example, the management controller 167 may examine a source of the request 240 (e.g., the first application 118A) and/or credential associated with the request 240.

In some embodiments, the management controller 167 may examine information in the request 240 that indicates the second application 118N to be modified. For example, the request 240 may include a unique name of the second application 118N to be modified. In some embodiments, the management controller 167 may maintain a mapping 250 between unique names and addresses and/or locations for the applications 118N of the cluster infrastructure 130. In some embodiments, the request 240 itself may contain the address and/or location for the second application 118N to be modified such that the mapping 250 is not necessary.

If the request 240 is authenticated by the management controller 167 (e.g., the first application 118A has the appropriate permissions) and the management controller 167 is able to locate the second application 118N to be modified from the location specified by the mapping 250 and/or the request 240, the management controller 167 may perform the request 240. For example, the management controller 167 may modify a characteristic and/or state the second application 118N in a manner specified by the request 240 to create the modified second application 118N'. Thus, a modified cluster infrastructure 130' may be formed having the modified second application 118N'. The modification to the characteristic of the second application 118N may include changes to resource limitations of the second application 118N, changes to security configuration of the second application 118N, or changes to the parameters associated with the execution of the second application 118N, though these are only examples, and other modifications to the second application 118N are contemplated within the embodiments of the present disclosure.

Though FIG. 3 illustrates an example in which the second application 118N is modified, the embodiments of the present disclosure are not limited to such a configuration. In some embodiments, request 240 may include instructions for modifying the second compute node 137N that is executing the second application 118N to form a modified second compute node 137N'.

In some embodiments, the modification to the second application 118N may include its termination. For example, the request 240 may request that the second application 118N and/or second compute node 137N be stopped. In such a case, if the request 240 is authenticated by the management controller 167 (e.g., the first application 118A has the appropriate permissions) and the management controller 167 is able to locate the second application 118N to be modified from the location specified by the mapping 250 and/or the request 240, the management controller 167 may terminate the second application 118N and/or the second compute node 137N.

Figure 4:
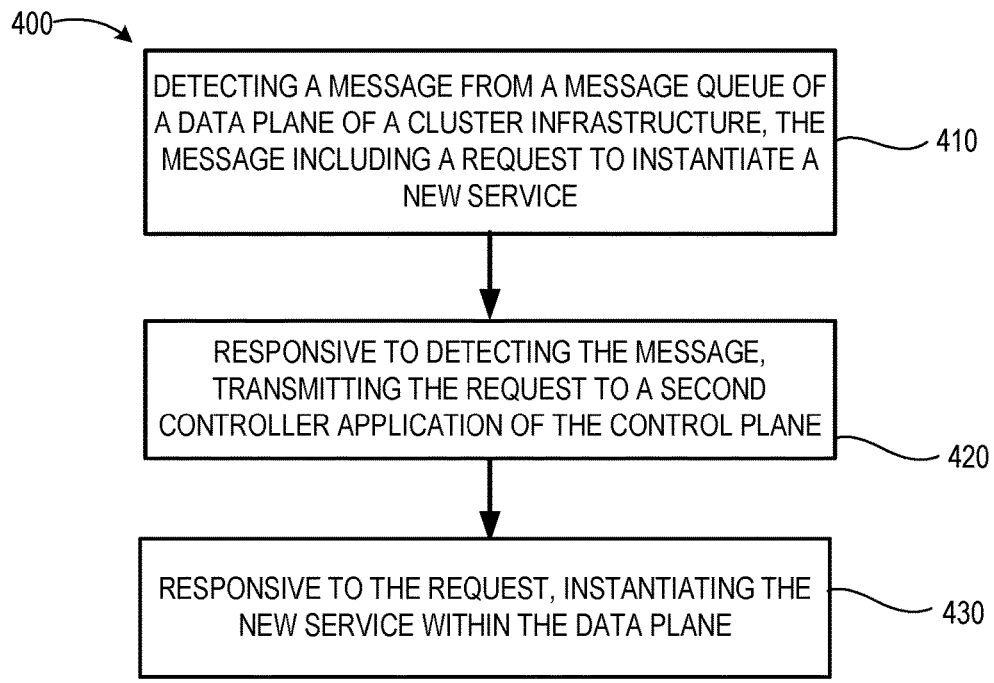
FIG. 4 is a flow diagram of a method for managing a cluster infrastructure, in accordance with some embodiments of the present disclosure.

FIG. 4 is a flow diagram of a method 400 for dynamically detecting an access point, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 1 to 3).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 to 3 as well, the method 400 begins at block 410, which includes detecting a message 175 from a message queue 170 of a data plane 136 of a cluster infrastructure 130. The message may include a request to instantiate a new service. In some embodiments, the detecting may be performed by a first controller application of a control plane 132 of the cluster infrastructure 130. In some embodiments, the first controller application may be similar to the message controller 169 described herein with respect to FIGS. 1 to 3. In some embodiments, the cluster infrastructure 130 may include a Kubernetes architecture and the data plane 136 may include a compute node 137 of the cluster infrastructure 130 executing the new service.

In some embodiments, detecting, by the first controller application of the control plane 132, the message 175 from the message queue 170 may include polling, by the first controller application, the message queue 170 within the data plane 136.

At block 420, the method may include, responsive to detecting the message 175, transmitting the request 240 to a second controller application of the control plane 132. In some embodiments, the second controller application may be similar to the management controller 167 described herein with respect to FIGS. 1 to 3.

At block 430, the method may include, responsive to the request 240, instantiating the new service within the data plane 136. In some embodiments, the request 240 to instantiate the new service includes one or more of a unique identifier of the new service or an identifier of a location of an image corresponding to the new service.

In some embodiments, the method may further include transmitting the message 175 to the message queue 170 from a manager application of the data plane 136. In some embodiments, the manager application of the data plane 136 may be similar to the data plane manager 156 described herein with respect to FIGS. 1 to 3. In some embodiments, the method may further include receiving, by the manager application the data plane 136, a request 240 from an executing application 118 and/or service of the data plane 136 and encapsulating the request 240 into the message 175 prior to transmitting the message 175 to the message queue 170.

In some embodiments, the message 175 is a first message, and the method 400 further includes detecting, by the first controller application of the control plane 132, a second message from the message queue 170 of the data plane 136, the second message comprising a request 240 to modify an executing service 118N of the data plane 136, responsive to detecting the second message, transmitting a second request to the second controller application, and, responsive to the second request 240, modifying a characteristic of the executing service 118N of the data plane.

Figure 5:
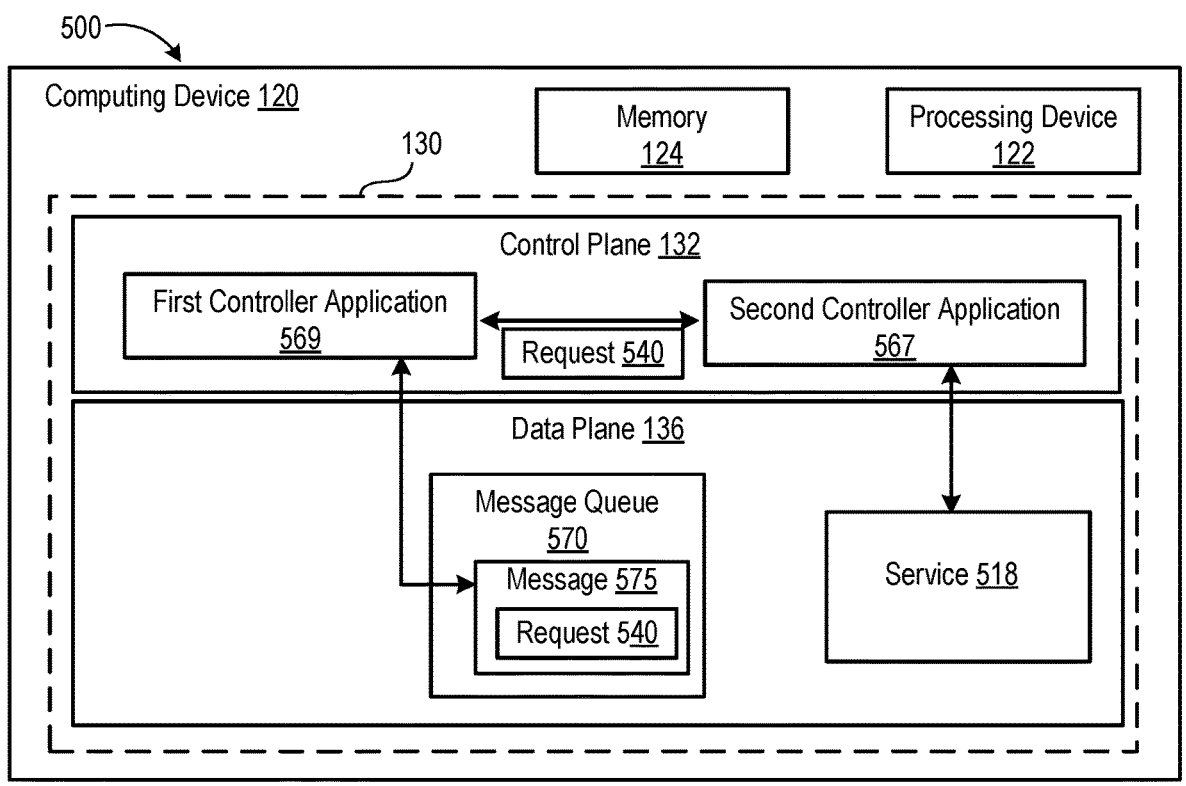
FIG. 5 is a component diagram of an example of a device architecture, in accordance with embodiments of the disclosure.

FIG. 5 is a schematic block diagram illustrating an example embodiment of a computer system 500 for managing a cluster infrastructure 130, in accordance with some embodiments of the present disclosure. A description of elements of FIG. 5 that have previously described has been omitted for brevity.

Referring to FIG. 5, system 500 may include computing device 120, including memory 124 and processing device 122, as described herein with respect to FIGS. 1 to 4. The processing device 122 may execute instruction code (e.g., as accessed from memory 124), portions of which are illustrated in FIG. 5.

As illustrated in FIG. 5, computing device 120 may run a cluster infrastructure 130. For example, the cluster infrastructure 130 may be stored as computer instructions in memory 124, and may be executed by processing device 122. The cluster infrastructure 130 may include a control plane 132 and a data plane 136. In some embodiments, the cluster infrastructure 130 may include a cluster based on Kubernetes/OpenShift.

The computing device 120 may detect a message 575 from a message queue 570 of the data plane 136 of the cluster infrastructure 130. The message 575 may include a request 540 to instantiate a new service 518. In some embodiments, a first controller application 569 of the control plane 132 of a cluster infrastructure 130 may detect the message 575 of the message queue 570. In some embodiments, the message 575 and message queue 570 may be similar to the message 175 and the message queue 170 described herein with respect to FIGS. 1 to 3. In some embodiments, the first controller application 569 may be similar to the message controller 169 described herein with respect to FIGS. 1 to 3. In some embodiments, the request 540 may be similar to the request 240 described herein with respect to FIGS. 1 to 3.

In some embodiments, the request 540 may be transmitted (e.g., by the processing device 122) to a second controller application 567 of the control plane 132 responsive to detecting the message 575. In some embodiments, the second controller application 567 may be similar to the management controller 167 described herein with respect to FIGS. 1 to 3.

The second controller application may instantiate the new service 518 within the data plane 136 of the cluster infrastructure 130. In some embodiments, the new service 518 may be similar to the application 118 described herein with respect to FIGS. 1 to 3. For example, the new service 518 may be similar to the new application 118N described herein with respect to FIG. 2.

The computer system 500 of FIG. 5 provides the ability to dynamically control the execution of a cluster infrastructure 130 in a way that does not substantially impact performance. The computer system 500 also allows applications (e.g., application 118 described herein with respect to FIGS. 1 to 3) of the data plane 136 to access the control plane 132 so as to create new services (e.g., new applications 118) or modify existing services, further providing additional functionality within the cluster infrastructure 130. Embodiments according to the present disclosure may provide for the ability for applications of the data plane 136 to asynchronously communicate with the control plane 132. The computer system 500 provides technological improvement to conventional devices in that it provides additional communication functionality from the data plane 136 to the control plane 132. Applications 118 executing within the data plane 136 may be capable of performing additional functionality not capable in conventional cluster infrastructures.

Embodiments according to the present disclosure may allow applications executing within the data plane 136 to dynamically adjust the makeup of the services provided by the data plane 136. For example, an application executing within the data plane 136 may determine that additional services are needed, or currently existing applications may need to be modified. Embodiments according to the present disclosure may allow for the adjustments to the cluster infrastructure 130 to be made directly from the data plane 136, increasing the flexibility and functionality of the cluster infrastructure 130.

Figure 6:
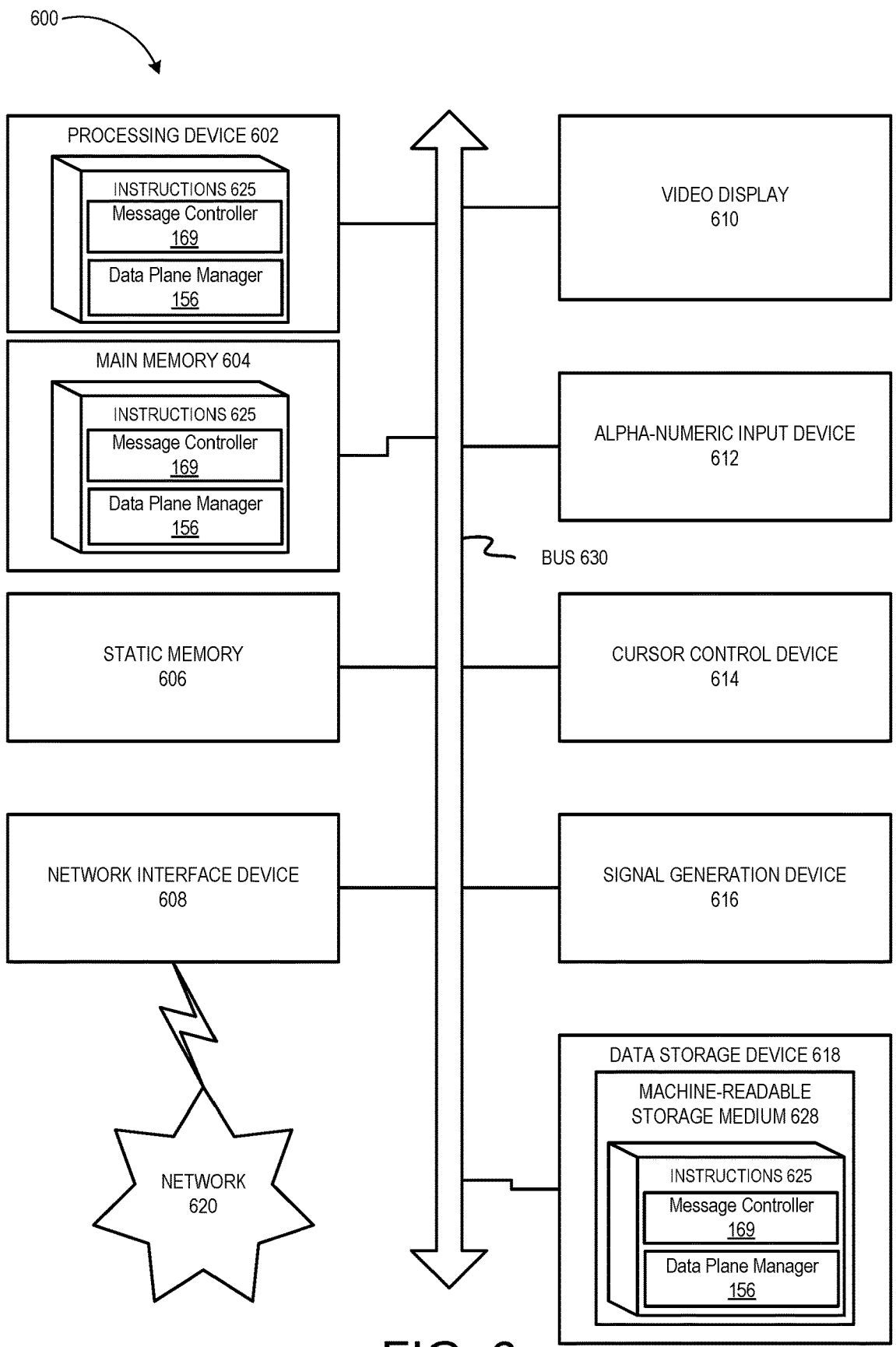
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a managing communications in a cluster infrastructure, e.g., message controller 169 and/or data plane manager 156, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "detecting," "transmitting," "instantiating," "receiving," "encapsulating," "polling," "modifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   detecting, by a first controller application of a control plane of a cluster infrastructure, a message from a message queue of a data plane of the cluster infrastructure;
   responsive to detecting the message from the message queue of the data plane of the cluster infrastructure, extracting a request to instantiate a new service encapsulated by the message, wherein the request includes an identifier of a location of an image corresponding to the new service;
   transmitting, by a processing device, the request from the first controller application of the control plane to a second controller application of the control plane; and
   responsive to the request, instantiating, by the second controller application, the new service within the data plane based on the location of the image corresponding to the new service included in the request.

2. The method of claim 1, further comprising:
   transmitting the message to the message queue from a manager application of the data plane.

3. The method of claim 2, further comprising:
   receiving, by the manager application, the request from an executing service of the data plane; and
   encapsulating the request into the message prior to transmitting the message to the message queue.

4. The method of claim 1, wherein detecting, by the first controller application of the control plane, the message from the message queue comprises:
   polling, by the first controller application, the message queue within the data plane.

5. The method of claim 1, wherein the cluster infrastructure comprises a Kubernetes architecture and the data plane comprises a compute node of the cluster infrastructure executing the new service.

6. The method of claim 1, wherein the request to instantiate the new service comprises one or more of a unique identifier of the new service or an identifier of a location of an image corresponding to the new service.

7. The method of claim 1, wherein the message is a first message, and
   wherein the method further comprises:
   detecting, by the first controller application of the control plane, a second message from the message queue of the data plane, the second message comprising a second request to modify an executing service of the data plane;
   responsive to detecting the second message, transmitting the second request to the second controller application; and
   responsive to the second request, modifying a characteristic of the executing service of the data plane.

8. A system comprising:
   a memory; and a processing device, operatively coupled to the memory, to:

detect, by a first controller application of a control plane of a cluster infrastructure, a message from a message queue of a data plane of the cluster infrastructure;

responsive to detecting the message from the message queue of the data plane of the cluster infrastructure, extracting a request to instantiate a new service encapsulated by the message, wherein the request includes an identifier of a location of an image corresponding to the new service;

transmit the request from the first controller application of the control plane to a second controller application of the control plane; and responsive to the request, instantiate, by the second controller application, the new service within the data plane based on the location of the image corresponding to the new service included in the request.

9. The system of claim 8, wherein the processing device is further to:

transmit the message to the message queue from a manager application of the data plane.

10. The system of claim 9, wherein the processing device is further to:

receive, by the manager application, the request from an executing service of the data plane; and encapsulate the request into the message prior to transmitting the message to the message queue.

11. The system of claim 8, wherein, to detect, by the first controller application of the control plane, the message from the message queue, the processing device is to poll, by the first controller application, the message queue within the data plane.

12. The system of claim 8, wherein the cluster infrastructure comprises a Kubernetes architecture and the data plane comprises a compute node of the cluster infrastructure executing the new service.

13. The system of claim 8, wherein the request to instantiate the new service comprises one or more of a unique identifier of the new service or an identifier of a location of an image corresponding to the new service.

14. The system of claim 8, wherein the message is a first message, and wherein the processing device is further to:

detect, by the first controller application of the control plane, a second message from the message queue of the data plane, the second message comprising a second request to modify an executing service of the data plane;

responsive to detecting the second message, transmit the second request to the second controller application; and responsive to the second request, modify a characteristic of the executing service of the data plane.

15. A non-transitory computer-readable storage medium including instructions that, when executed by a processing device, cause the processing device to:

detect, by a first controller application of a control plane of a cluster infrastructure, a message from a message queue of a data plane of the cluster infrastructure;

responsive to detecting the message from the message queue of the data plane of the cluster infrastructure, extracting a request to instantiate a new service encapsulated by the message, wherein the request includes an identifier of a location of an image corresponding to the new service;

transmit, by the processing device, the request from the first controller application of the control plane to a second controller application of the control plane; and responsive to the request, instantiate, by the second controller application, the new service within the data plane based on the location of the image corresponding to the new service included in the request.

16. The non-transitory computer-readable storage medium of claim 15, wherein the processing device is further to:

transmit the message to the message queue from a manager application of the data plane.

17. The non-transitory computer-readable storage medium of claim 16, wherein the processing device is further to:

receive, by the manager application, the request from an executing service of the data plane; and encapsulate the request into the message prior to transmitting the message to the message queue.

18. The non-transitory computer-readable storage medium of claim 15, wherein, to detect, by the first controller application of the control plane, the message from the message queue, the processing device is to poll, by the first controller application, the message queue within the data plane.

19. The non-transitory computer-readable storage medium of claim 15, wherein the request to instantiate the new service comprises one or more of a unique identifier of the new service or an identifier of a location of an image corresponding to the new service.

20. The non-transitory computer-readable storage medium of claim 15, wherein the message is a first message, and wherein the processing device is further to:

detect, by the first controller application of the control plane, a second message from the message queue of the data plane, the second message comprising a second request to modify an executing service of the data plane;

responsive to detecting the second message, transmit the second request to the second controller application; and responsive to the second request, modify a characteristic of the executing service of the data plane.

* * * * *